No. 699,709. Patented May 13, 1902.
A. PULBROOK.
ELASTIC SUPPORT FOR VEHICLES.
(Application filed Dec. 3, 1901.)

(No Model.) 3 Sheets—Sheet 1.

Witnesses. Inventor,

No. 699,709. Patented May 13, 1902.
A. PULBROOK.
ELASTIC SUPPORT FOR VEHICLES.
(Application filed Dec. 3, 1901.)
(No Model.) 3 Sheets—Sheet 2.
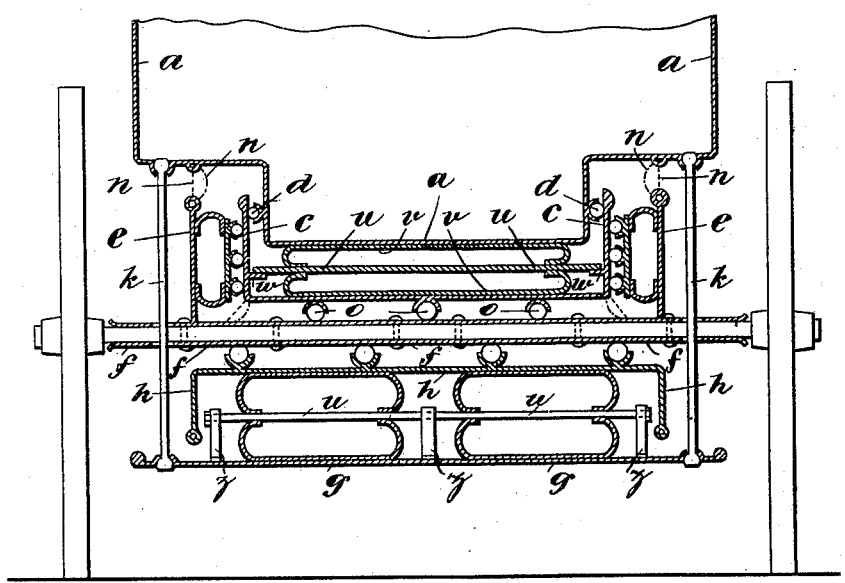
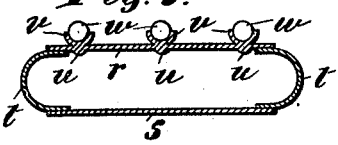
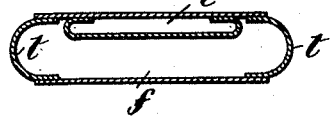
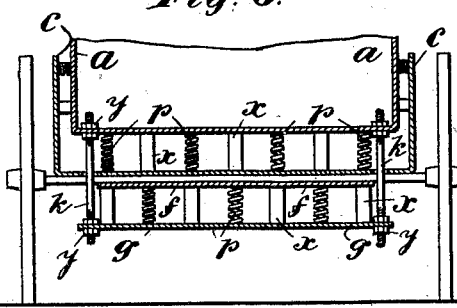
Witnesses. Inventor No. 699,709. Patented May 13, 1902.
A. PULBROOK.
ELASTIC SUPPORT FOR VEHICLES.
(Application filed Dec. 3, 1901.)
(No Model.) 3 Sheets—Sheet 3.
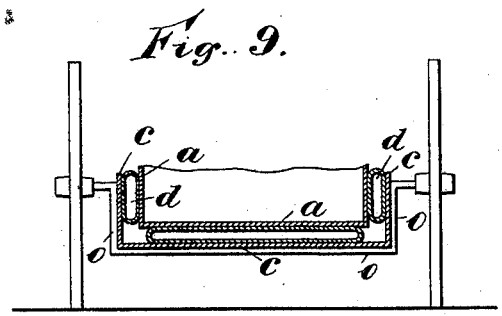
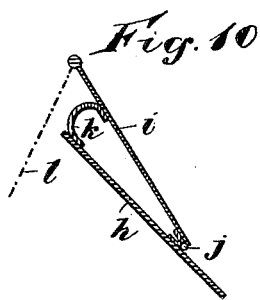 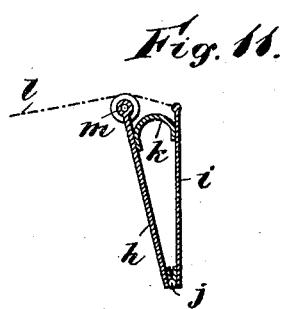
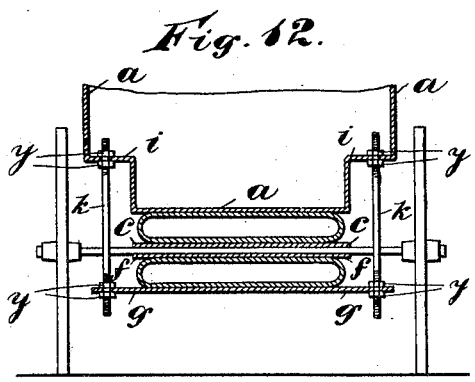
Witnesses. Inventor.
Anthony Pulbrook

UNITED STATES PATENT OFFICE.

ANTHONY PULBROOK, OF LONDON, ENGLAND.

ELASTIC SUPPORT FOR VEHICLES.

SPECIFICATION forming part of Letters Patent No. 699,709, dated May 13, 1902.

Application filed December 3, 1901. Serial No. 84,497. (No model.)

*To all whom it may concern:*

Be it known that I, ANTHONY PULBROOK, a subject of the King of Great Britain, residing at London, England, have invented certain new and useful Improvements in or Connected with Elastic Supports for Vehicles; and I do hereby declare the following to be a full, clear, and exact description of the invention, such as will enable others skilled in the art to which it appertains to make and use the same.

This invention consists in improved elastic devices for supporting the bodies of vehicles of every description and insulating the same from shock and vibration.

When a body suspended from or resting on a spring is free to rise or fall except so far as its action is checked by the strength or elasticity of the spring, any jolt tends to raise or lower the body to the limit allowed by the elasticity of the spring; but excessive jolting is liable to make the body rise and fall too much for safety or comfort. The improved method adopted in this invention is to hang or support the body (or the body and something connected therewith or secured thereto) so that the movements of the body actuate two oppositely-acting springs or set of springs, pneumatic cushions, or fluid-tight compartments or receptacles containing a compressible fluid, such as air or gas, in a greater or less state of pressure or elastic or resilient substances of suitable material in such a manner as will cause one spring or set of springs or the like when acting in compression to be counteracted by the other set acting in tension, and vice versa. The pressure exerted by the springs may be made adjustable by any suitable means.

Figure 1:
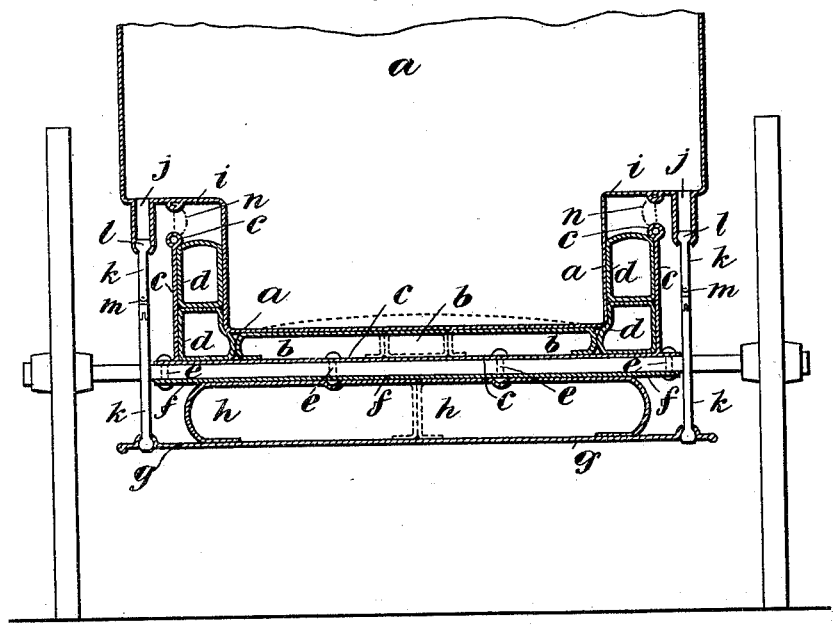
Figure 2:
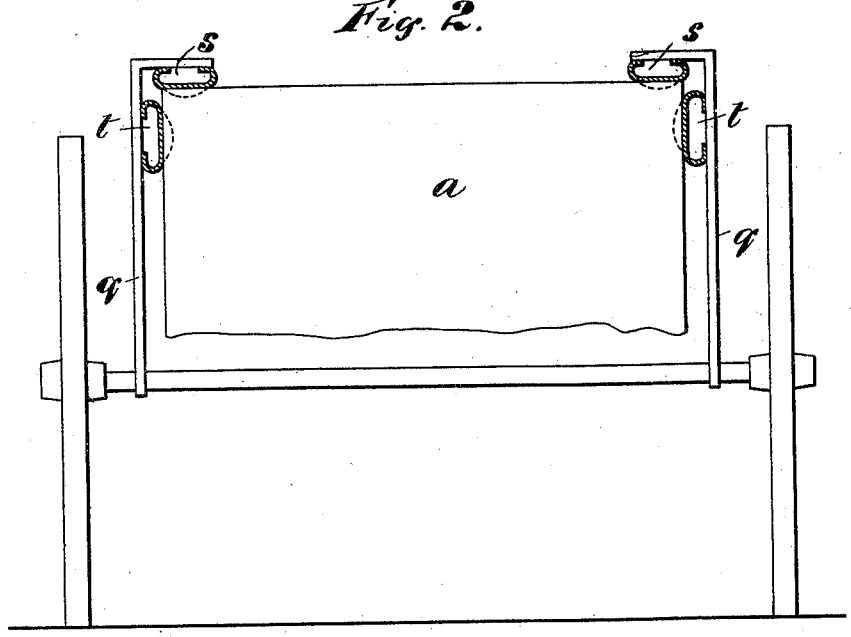

Figure 1 of the accompanying diagrammatic drawings is a transverse section illustrating how the body portion of a vehicle is supported and protected by pneumatic cushions receiving, distributing, insulating, and neutralizing the effect of vertical, longitudinal, and lateral shocks and vibration. Fig. 2 represents another similar method of receiving and neutralizing shocks. Fig. 3 illustrates methods by which the rolling of fluid-compartments is utilized for the purpose of absorbing vibration. Figs. 4 and 5 are views, to a larger scale, of parts of Fig. 3. Fig. 6 illustrates a method of using counteracting-springs or elastic material in lieu of fluid-compartments. Fig. 7 shows the construction of a fluid-tight compartment to allow for wear, tear, and rolling. Fig. 8 shows the construction of fluid-tight compartments to hold fluids of different characters or of varying pressures. Fig. 9 shows the means of applying my invention to vehicles having drop or crank axles. Fig. 10 shows means for neutralizing vibration by suspending the body of a vehicle from a fluid-tight compartment, Fig. 11 shows a modification thereof, and Fig. 12 a method of attaching the body of the vehicle to the under platform.

In Fig. 1, $a$ is the body of the vehicle, resting or bearing upon a fluid-tight compartment or compartments $b$, secured to the upper part of the under carriage or traction portion of the vehicle. The fluid-compartments $b$ are wholly or partially made of pliable material, allowing for deformation within limits when operated on by the varying pressure of a contained fluid. They are preferably inclosed in a tank $c$, platform, or the like, preferably having sides or ends, as shown, made of rigid and inextensible material and lined on its four sides with one or more fluid-tight compartments $d$, against which the body $a$ bears or presses. In some cases springs and bands of elastic material may be employed in lieu of fluid-tight compartments, as shown and described with reference to Fig. 6. The tank $c$ either rests upon a rigid and inextensible support or platform secured to and supported by the under carriage or the bottom of the tank or like receptacle may be made of rigid or inextensible material secured in like manner.

$e$ represents bolts or rivets securing the platform or tank to the under carriage and preferably to an under platform $f$, or it may be secured in any other manner to form part of the frame of the under carriage. One or more fluid-tight compartments or pneumatic cushions $h$ may be interposed between the under portion of these platforms or tank and a lower rigid platform $g$ and suspended (preferably movably or adjustably) from the body $a$, as hereinafter described. The platform $g$ is secured or attached to the body of the vehicle $a$ in such a manner as will allow that body to sway and move within limits in all directions when the vehicle is running over a rough or uneven surface. A method of effecting this is as follows:

$i$ represents shoulder-like projections from the body $a$, which may either form part of the body, as shown, or may be flanges or like projections therefrom. Through a hole or slot $j$ a rod $k$ passes, preferably in such a manner as will allow it to move freely in the opening or slot, or it may be secured to the projection $i$ in any other suitable manner, or the opening or slot may be made channel shape, as shown in the drawings between the letters $j$ and $l$. This rod $k$ has a rounded head, projection, or other suitable contrivance $l$ to secure it to the body and to prevent it slipping or being pulled through the slot or opening, the bottom of which is similarly rounded to receive it. After passing through the opening or slot the rod $k$ is continued downward, either outside the tank and platform $c$ and $f$, as shown in the drawings, or through openings therein, as shown in Fig. 3, until it reaches the lower platform $g$, to which it is connected in a somewhat similar manner, or in some cases the rods $k$ may be secured to the body $a$ and lower platform $g$, as shown in Fig. 12. It will be understood that as the body $a$ is caused to rise the pneumatic cushions $h$ will bear on or press against the platform $f$, and thereby compress the fluid in the pneumatic cushions until an equilibrium of pressure in the fluid-compartments $b$ and $h$ is restored. The rods $k$ may be provided with a universal knuckle or hinge joint at $m$ to allow of lateral or longitudinal movement of the body $a$, but not of vertical extension of the rod $k$, so that any vertical movement compresses one of the pneumatic cushions either above or below the platforms, tank, or the like. Any roll beyond a fixed limit may be prevented by means of a loose flexible band, chain, or the like, as shown at $n$. The dotted curved line above the chamber $b$ shows the form assumed by the pneumatic cushions when they have pliable tops and are not being borne upon.

The elastic fluid may consist wholly or partly of a purely compressible fluid.

It will be understood that any known or suitable non-return valves (not shown in the drawings) will be placed in convenient positions for filling all fluid-compartments and that the latter will be made of air-tight materials.

In some cases inextensible rods or brackets $q$ or the like are employed, as shown in Fig. 2, fixed or secured to the upper part of the under carriage with fluid-tight compartments $s$ and $t$, (or springs or elastic material after the manner shown in Fig. 6,) secured as shown. Instead of the rods or brackets $q$ passing to the top of the body $a$, as shown, they may have shoulders or projections extending from the body over which the arm or projection may extend, similar fluid-compartments, springs, or elastic substances being placed between the two projections.

Instead of fixed fluid-compartments rolling compartments are sometimes used, as illustrated in Fig. 3, in which $c$ is a movable tank or the like. $u$ is an axle working on the sides or ends of the tank or on a support or projection therefrom. Secured to this axle is a fluid-compartment $v$, made of pliable material, as in the well-known pneumatic tires, the body $a$ resting or bearing on this compartment. One only or several of such rolling fluid-compartments may be used. When the supports for the axle $u$ are fixed to the insides of the tank, as shown at $w$ in Fig. 3, they have preferably a rounded depression $y$ to receive the axle $u$, as shown in Fig. 4. It is obvious that instead of the axle working on the sides or ends of the tank, the rolling body may be supported by the body of the vehicle itself, as shown in Fig. 5, in which $u$ represents the axle carried in bearings in the frame $z$, (which when operating on the upper part of the under carriage will be in the reverse vertical position to that shown in the drawings.)

To keep the body of the vehicle in place with relation to the sides of the tank, a ball-and-socket or other similar device may be introduced between the body and the side of the tank $c$, as shown at $d$ in Fig. 3, in which the tank $c$ is shown inside another tank $e$, secured to the under carriage, or it may be on a platform preferably having sides, as shown in the figure. The inner tank $c$ is supported in the larger tank $e$ on rollers, balls and sockets, casters $o$, or the like, whereby the said inside tank is free to move in the reverse direction laterally or longitudinally to the movement allowed the body $a$.

$n$ in Figs. 1 and 3 represents loose bands or the like attached to the body $a$ or the movable tank $c$ and the fixed tank $e$ or to the under carriage in such a manner as will allow of the free movement of the body $a$ or tank $c$ up to a limit, but not beyond, the straight dotted line showing the band restricting further movement. Counteracting springs or bands of elastic material may also be employed, as shown in Fig. 6, for restricting this free movement. When using rolling bodies in the under fluid-compartment placed between the platforms $f$ and $g$, a reversed tank $h$ may be used, as shown in Fig. 3, preferably mounting the axle in brackets $z$, Fig. 3.

Fig. 6 illustrates the application of metallic springs or bands of elastic material $x$ to the body $a$ of a vehicle, being secured to such body (or something attached thereto) and also to the platform or frame $c$, secured or attached to the under carriage. Similarly springs $p$ or bands $x$ are fixed to the upper part of platform $g$ and to the under part of the platform or frame $f$, secured to the under carriage. The rods or connectors $k$ are fixed in such a manner as will cause one set of springs or the like between the body $a$ and the upper part of the platform $c$ when in compression to act on the springs or elastic substance between the under part of the platform $f$ and the platform $g$ in tension, and vice versa. A method of connecting in this manner is also shown in Fig. 12, $k$ being a screwed rod or bolt to which the body $a$ and the platform $g$ are rigidly but adjustably connected by means of the nuts $y$. It will be obvious that unless the wheels of the vehicle are allowed to run free sufficient allowance must be made for permitting the vehicle to turn, also that in a four-wheeled vehicle with two independent under carriages an independent set of fluid-compartments should be used in connection with the under carriages of the pair of front and back wheels, respectively, and in such a manner as to allow each under carriage to work independently of the other. In this case the platforms or tanks in the fore carriage are preferably made round or oblong and are secured in such a manner that they may revolve.

Fig. 7 shows a form of fluid-compartment having its top $r$ and bottom $s$ of rigid and inextensible material and pliable material $t$ only at its sides, which are sometimes laminated. The rigid material may be strengthened both laterally and longitudinally by projections therefrom, as shown by the letter $u$, the letter $v$ representing sockets to receive balls $w$ to move against a corresponding flat surface.

Fig. 8 shows another variation of a fluid-compartment consisting of one compartment $e$, inclosed inside another compartment $f$. The inner compartment $e$ is preferably inflated to a greater pressure than the outer and is preferably secured to the under carriage or something attached thereto. $t$ represents pliable material.

When cranked or sunk axles are used, as shown at $o$ in Fig. 9, the tank or platform $c$ is dropped into the depression, thereby lowering the center of gravity of the vehicle and rendering it more stable, sufficient clearance being allowed for the oscillation of the body.

Fig. 10 illustrates a fluid-compartment adapted for the body of the vehicle to be suspended therefrom. $h$ represents a rigid support, platform, or the like attached to or forming part of the under carriage. $i$ is a rigid plate working on a hinge $j$, and $k$ is fluid-tight pliable material connecting the two parts $h$ and $i$ in such a manner as to allow them to open and close like a bellows. The body of the vehicle is suspended from the movable plate $i$ by means of a strap $l$ or the like. The movable plate $i$ is placed at the upper part when using the compression of the contained elastic fluid to absorb vibration, for which purpose it projects beyond the plate $h$, as shown; but when the compartment operates by attenuating the contained elastic fluid, so that the outside atmospheric pressure exceeds the internal pressure, the fixed support $h$ may be either above or below the movable plate $i$. The body of the vehicle may be similarly suspended at the sides as well as the ends. A pulley $m$ may be used, as shown in Fig. 11, especially when using the fluid-compartments vertically or a non-projecting plate $i$. Instead of being suspended the body of the vehicle may be connected horizontally on each side or end.

Having now particularly described and ascertained the nature of the said invention and in what manner the same is to be performed, I wish it to be understood that I make no claim to the general use of fluid-compartments or counteracting-springs to restrict vibration, but that What I do claim is—

1. In a vehicle, the combination with a supporting-axle, of a box-shaped frame carried thereby, a body extending within said frame, cushioning devices located between the vertical walls of the frame and the vertical walls of the body, and independent cushioning devices between horizontal portions of the frame and horizontal portions of the body, substantially as described.

2. In a vehicle, the combination with the axle, of a suitable frame including vertical side members, a body having a portion depending within said side members, cushion devices beneath said body for yieldingly supporting the same, and independent cushion devices between said side members and the depending side portions of the body, substantially as described.

3. In a vehicle the combination with the supporting-axle, of a suitable frame secured thereto, having vertical side walls or portions, a body having a portion seated within said side walls, cushion devices interposed between said frame and body, cushion devices interposed between said body and said side walls, a platform beneath the axle, connections between said platform and the body, and cushion devices between said platform and the frame, substantially as described.

4. In a vehicle, the combination with the supporting-axle, of a suitable frame secured thereto, having vertical side walls or portions, a body having a reduced portion depending within said side walls, cushion devices interposed between the bottom of said reduced portion and said frame, a platform beneath the axle, connections between said platform and body, and cushion devices between said platform and the frame, substantially as described.

5. In a vehicle, the combination with the supporting-axle, of a suitable frame secured thereto, a body having a reduced portion or bottom located in proximity to said frame, a platform located beneath the axle and frame, cushion devices located between said reduced body bottom and frame and between the frame and platform, and tie-rods connecting the enlarged portions of the body with the platform, substantially as described.

6. In a vehicle, the combination with the supporting-axle, of a suitable frame secured thereto, a body having a reduced portion or bottom located in proximity to said frame, a platform located beneath the axle and frame, cushion devices located between said reduced body-bottom and frame and platform and frame, and tie-rods connecting the enlarged portions of the body with the platform, said tie-rods having universal joint connections with the body and platform, substantially as described.

7. In a vehicle, the combination with the supporting-axle, of a frame carried thereby, an elongated pneumatic cushion seated on said frame, a body having its bottom supported on said cushion, a platform beneath the axle, tie-rods connecting the platform with the body, and an elongated pneumatic cushion interposed between the frame and platform substantially as described.

8. In a vehicle the combination with the supporting-axle, of a box-shaped frame carried thereby having vertical side walls, of a body having a portion depending within said side walls, an elongated pneumatic cushion between the bottom of the body and the frame, and independent pneumatic cushions between the sides of said body and the vertical walls of the frame, substantially as described.

In witness whereof I have hereunto set my hand in presence of two witnesses.

ANTHONY PULBROOK.

Witnesses:
THOMAS JOHN OSMAN,
WALTER J. SKERTEN.